(12) United States Patent
Meng et al.

(10) Patent No.: US 11,537,004 B2
(45) Date of Patent: Dec. 27, 2022

(54) TRANSPARENT DISPLAY SUBSTRATE AND TRANSPARENT DISPLAY DEVICE

(71) Applicant: BOE Technology Group Co., Ltd., Beijing (CN)

(72) Inventors: Xiandong Meng, Beijing (CN); Jifeng Tan, Beijing (CN); Wei Wang, Beijing (CN); Qiuyu Ling, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/423,008

(22) PCT Filed: Jun. 8, 2020

(86) PCT No.: PCT/CN2020/094944
§ 371 (c)(1),
(2) Date: Jul. 14, 2021

(87) PCT Pub. No.: WO2020/253567
PCT Pub. Date: Dec. 24, 2020

(65) Prior Publication Data
US 2022/0100038 A1    Mar. 31, 2022

(30) Foreign Application Priority Data
Jun. 18, 2019  (CN) .......................... 201910527365.2

(51) Int. Cl.
*G02B 6/34*      (2006.01)
*G02B 5/18*      (2006.01)
(Continued)

(52) U.S. Cl.
CPC ..... *G02F 1/133607* (2021.01); *G02B 6/0016* (2013.01); *G02B 6/34* (2013.01);
(Continued)

(58) Field of Classification Search
CPC ......... G02F 2201/305; G02F 1/133607; G02F 1/133606; G02B 6/34; G02B 5/18;
(Continued)

(56) References Cited

U.S. PATENT DOCUMENTS

2011/0141395 A1   6/2011  Yashiro
2019/0196091 A1*  6/2019  Li .......................... G02B 6/005
(Continued)

FOREIGN PATENT DOCUMENTS

CN    203150019 U    8/2013
CN    203337950 U   12/2013
(Continued)

OTHER PUBLICATIONS

English language translation of Chinese Patent Application publication No. CN108051961A having a priority date of Jan. 2, 2018. Document downloaded on Sep. 1, 2022 from Espacenet at worldwide.espacenet.com. Machine translation provided by Google Translate tool on website. (Year: 2018).*

(Continued)

*Primary Examiner* — Angela K Davison
(74) *Attorney, Agent, or Firm* — IPro, PLLC

(57) ABSTRACT

A transparent displaying base plate and a transparent displaying device. The transparent displaying base plate includes a displaying layer (2) and a liquid-crystal grating layer (3) provided on one side of the displaying layer (2), the displaying layer (2) includes black matrixes (15) and displaying regions (A) defined by the black matrixes (15), the liquid-crystal grating layer (3) is provided with a backlight unit on one side that is further away from the displaying layer (2), and the backlight unit includes a backlight layer for exiting backlight light rays to the displaying layer (2), and at least a light focusing layer for focusing the backlight (Continued)

light rays directly facing the positions of the displaying regions (A) to the black matrixes (15).

9 Claims, 3 Drawing Sheets

(51) Int. Cl.
  *G02F 1/1335* (2006.01)
  *F21V 8/00* (2006.01)
  *G02F 1/13357* (2006.01)
(52) U.S. Cl.
  CPC .. *G02F 1/133512* (2013.01); *G02F 1/133603* (2013.01); *G02F 1/133606* (2013.01); *G02B 5/1814* (2013.01); *G02B 5/1819* (2013.01); *G02B 5/1823* (2013.01); *G02B 5/1828* (2013.01); *G02B 6/005* (2013.01)
(58) Field of Classification Search
  CPC .. G02B 5/1814; G02B 5/1819; G02B 5/1823; G02B 5/1833; G02B 5/1828; G02B 3/0006; G02B 3/08; G02B 2300/0093
  See application file for complete search history.

(56) References Cited

U.S. PATENT DOCUMENTS

| | | |
|---|---|---|
| 2020/0212362 A1 | 7/2020 | Leng et al. |
| 2020/0285104 A1 | 9/2020 | Meng et al. |
| 2020/0371279 A1 | 11/2020 | Meng et al. |

FOREIGN PATENT DOCUMENTS

| | | |
|---|---|---|
| CN | 105929602 A | 9/2016 |
| CN | 108073000 A | 5/2018 |
| CN | 108646338 A | 10/2018 |
| CN | 108717243 A | 10/2018 |
| CN | 109061948 A | 12/2018 |
| CN | 109493746 A | 3/2019 |
| CN | 110244492 A | 9/2019 |
| WO | 2009016786 A1 | 2/2009 |

OTHER PUBLICATIONS

PCT/CN2020/094944 international search report and written opinion.
CN201910527365.2 first office action and Search Report.
CN201910527365.2 second office action.

* cited by examiner

TRANSPARENT DISPLAY SUBSTRATE AND TRANSPARENT DISPLAY DEVICE

CROSS REFERENCE TO RELEVANT APPLICATIONS

The present disclosure claims the priority of the Chinese patent application filed on Jun. 18, 2019 with the application number of 201910527365.2, which is incorporated herein in its entirety by reference.

TECHNICAL FIELD

The present application generally relates to the technical field of displaying, and particularly relates to a transparent displaying base plate and a transparent displaying device.

BACKGROUND

Conventional transparent displaying devices couple at a certain central angle the lambert-reflector light-ray modulation of LED light sources into a light guide plate by using free-form-surface reflecting mirrors. In the total-reflection transmission inside the light guide plate, light picking gratings are provided over or under the light guide plate. The function of the light picking gratings is to pick at the collimated angle the large-angle light rays that are total-reflection propagated inside the light guide plate, which realizes collimated-light sources of a high transmittance (most of the background lights can pass through the light guide plate). Liquid-crystal gratings and light-shielding-layer arrays are provided over the light picking gratings, and the exiting collimated lights are absorbed by the light shielding layer to realize the dark state (L0). In the displaying light state (L255), a set of voltage signals are applied to the liquid-crystal layers of the liquid-crystal gratings, which enables the liquid-crystal layers to form predetermined gratings, and the lights exit after being diffracted by the liquid-crystal gratings. By applying different voltage signals to the liquid-crystal layer, different diffraction efficiencies of the liquid-crystal gratings to the incident lights can be realized, to realize multi-grayscale displaying.

However, in the fabrication, because of the process for fabricating the gratings, the glass surfaces of the non-light-picking-port regions/the transparent displaying regions are inevitably etched, and the side surfaces of the light guide plate are inevitably rough, which results in that light leakage happens in dark-state displaying, which reduces the displaying contrast.

SUMMARY

The present application provides a transparent displaying base plate and a transparent displaying device, to solve the problem of light leakage in dark-state displaying, which reduces the displaying contrast.

In a first aspect, the present application provides a transparent displaying base plate, comprising a displaying layer and a liquid-crystal grating layer provided on one side of the displaying layer, the displaying layer comprising black matrixes and displaying regions defined by the black matrixes, wherein the liquid-crystal grating layer is provided with a backlight unit on one side that is further away from the displaying layer, and the backlight unit comprises a backlight layer for exiting backlight light rays to the displaying layer, and at least a light focusing layer for focusing the backlight light rays directly facing positions of the displaying regions to the black matrixes.

In some embodiments, the backlight layer comprises a light guide plate, and the light guide plate is provided with a grating layer on one side facing the displaying layer.

In some embodiments, the light focusing layer comprises convex lenses arranged in an array, optical axes of the convex lenses pass through the black matrixes, and each of light picking gratings of the grating layer corresponds to one of the convex lenses.

In some embodiments, the light focusing layer comprises Fresnel Zone plates arranged in an array, optical axes of the Fresnel Zone plates pass through the black matrixes, and each of light picking gratings of the grating layer corresponds to one of the Fresnel Zone plates.

In some embodiments, the convex lenses are provided with light transmitting through holes, the light transmitting through holes directly face the light picking gratings, an aperture of the light transmitting through holes is greater than or equal to a width of the light picking gratings, and the aperture of the light transmitting through holes is less than or equal to a width of the black matrixes.

In some embodiments, the light guide plate is provided with a light scattering layer on one side that is further away from the light focusing layer, the light scattering layer comprises concave lenses arranged in an array, the convex lenses directly face the concave lenses one to one, and a focal length of the convex lenses and a focal length of the concave lenses are equal.

In some embodiments, the backlight layer comprises LED light sources arranged in a matrix, the LED light sources directly face the black matrixes, half-reflection half-transmission films of a concave-face structure are provided at positions directly facing the LED light sources, and inwardly concave faces of the half-reflection half-transmission films are reflecting faces, and face the LED light sources and the black matrixes.

In some embodiments, the inwardly concave faces of the half-reflection half-transmission films are provided with convex lenses, and outwardly convex faces of the half-reflection half-transmission films are provided with concave lenses, wherein a focal length of the convex lenses and a focal length of the concave lenses are equal.

In a second aspect, the present application provides a transparent displaying device, wherein the transparent displaying device comprises the transparent displaying base plate stated above.

By using the above solutions according to the present application, in dark-state displaying, by focusing, by using the light focusing layer, the backlight light rays directly facing the positions of the displaying regions to the black matrixes, the positions of the displaying regions have no transmission of the backlight light rays, which overcomes the problem of light leakage in dark-state displaying, and increases the displaying contrast.

BRIEF DESCRIPTION OF THE DRAWINGS

By reading the detailed description on the non-limiting embodiments with reference to the following figures, the other features, objects and advantages of the present application will become more apparent.

DETAILED DESCRIPTION

The present application will be described in further detail below with reference to the drawings and the embodiments. It can be understood that the particular embodiments described herein are merely intended to interpret the relevant application, and not limit the present application. It should also be noted that, in order to facilitate the describing, the drawings merely show the parts relative to the present application.

It should be noted that, subject to the avoiding of any conflict, the embodiments and the features of the embodiments of the present application may be combined. The present application will be described in detail below with reference to the drawings and the embodiments.

Figure 1:
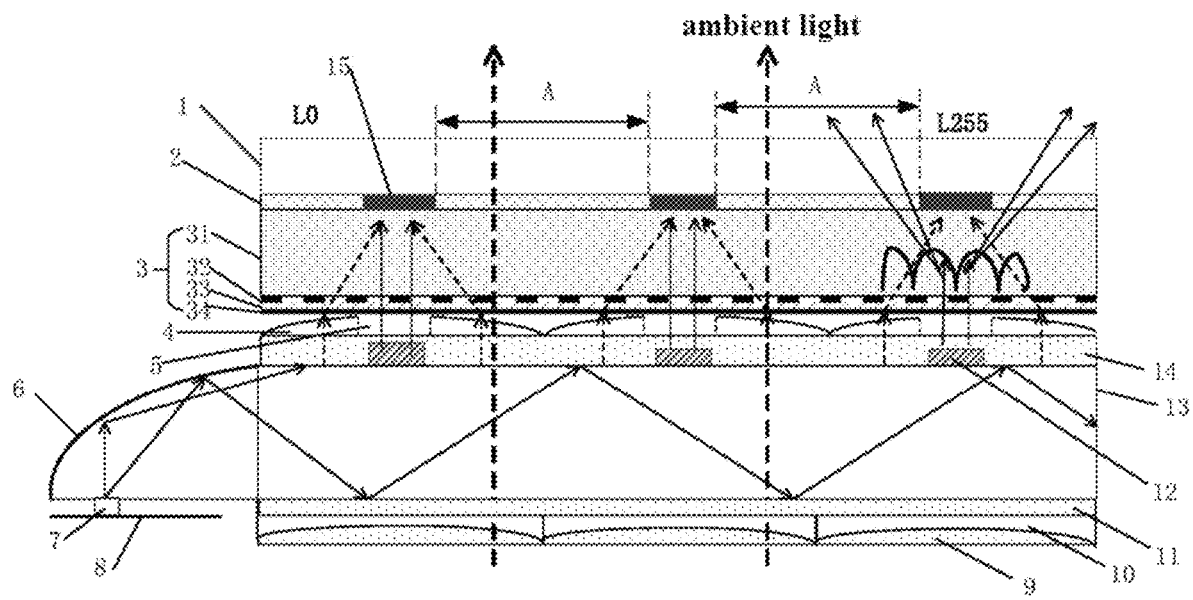
FIG. 1 is a schematic structural diagram of the transparent displaying base plate according to an embodiment of the present application.

As shown in FIG. 1, the transparent displaying base plate according to an embodiment of the present application comprises a displaying layer 2 and a liquid-crystal grating layer 3 provided on one side of the displaying layer 2. The displaying layer 2 comprises black matrixes 15 and displaying regions A defined by the black matrixes 15. The displaying regions A are the regions where the pixels are formed. The liquid-crystal grating layer 3 is provided with a backlight unit on one side that is further away from the displaying layer 2. The backlight unit comprises a backlight layer for exiting backlight light rays to the displaying layer 2, and at least a light focusing layer for focusing the backlight light rays directly facing the positions of the displaying regions A to the black matrixes 15.

In dark-state displaying, by focusing, by using the light focusing layer, the backlight light rays directly facing the positions of the displaying regions A to the black matrixes 15, the positions of the displaying regions A have no transmission of the backlight light rays, which overcomes the problem of light leakage in dark-state displaying, and increases the displaying contrast.

Figure 2:
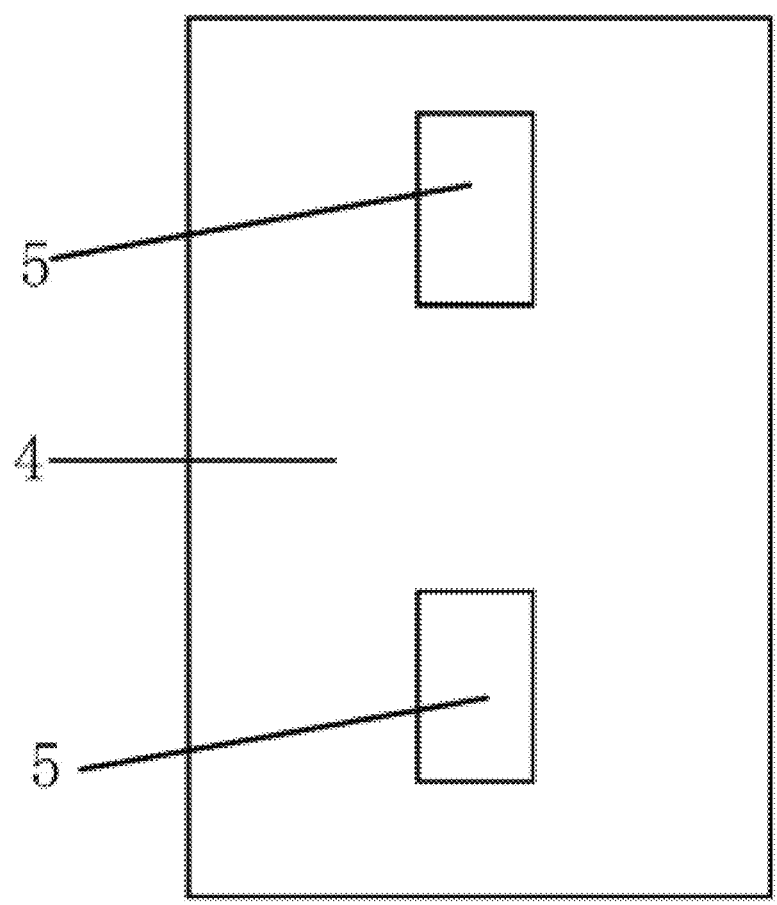
FIG. 2 is a top view of the convex lens according to an embodiment of the present application.
Figure 3:
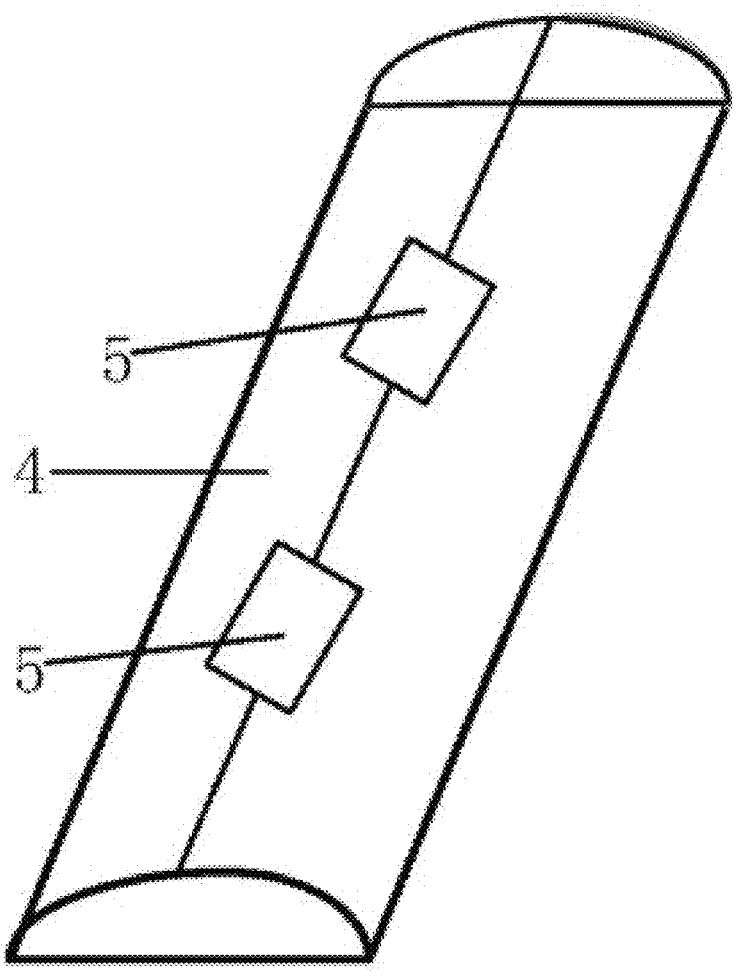
FIG. 3 is a perspective view of the convex lens according to an embodiment of the present application.

As an implementation, the backlight unit comprises a backlight layer for exiting backlight light rays to the displaying layer 2. The backlight layer comprises a light guide plate 13. The light guide plate 13 is provided with a grating layer on one side facing the displaying layer 2. The light guide plate 13 is provided with a reflector housing 6 on a side. The reflector housing 6 is used to couple the lambert-reflector light-ray modulation of the backlight sources (for example, the LED light sources 7 and so on) into the light guide plate 13 at a certain central angle. In the total-reflection transmission inside the light guide plate 13, the light picking gratings 12 of the grating layer formed on the light guide plate 13 pick at the collimated angle the large-angle light rays that are total-reflection propagated inside the light guide plate 13, which realizes a collimated-light source of a high transmittance. The light focusing layer comprises convex lenses 4 arranged in an array; for example, the convex lenses 4 arranged in an array may be arranged in one column and a plurality of rows, and, when such a form is employed, referring to FIGS. 2 and 3, the convex lenses 4 are strip-shaped convex lenses 4. The optical axes of the convex lenses 4 pass through the black matrixes 15, and, therefore, the backlight light rays exiting from the light guide plate 13 can be converged to the black matrixes 15, whereby, in dark-state displaying, the backlight light rays exiting from the light guide plate 13 cannot reach the displaying regions A, which overcomes the problem of light leakage in dark-state displaying, and increases the contrast. Each of the light picking gratings 12 of the grating layer corresponds to one of the convex lenses 4; in other words, at each of the light picking gratings 12, there is one convex lens 4. In practical usage, one convex lens 4 may correspond to one light picking grating 12, and may also correspond to a plurality of light picking gratings 12. For example, when the above convex lenses 4 are of the strip-shaped structure, a plurality of light picking gratings 12 may be correspondingly provided in the direction of extension along the strip of the convex lenses 4. The liquid-crystal grating layer 3 is provided on the light focusing layer. When the liquid-crystal grating layer 3 is in the state of not being applied electricity, it is equivalent to a transparent flat panel. When the liquid-crystal grating layer 3 is in the state of being applied electricity, it presents the state of a grating, and it has the effect of diffraction to the light rays that pass through it, whereby the backlight light rays that pass through the light focusing layer and are focused to the black matrixes 15 are diffracted. Furthermore, as the voltage increases, the effect of diffraction is intensified. By controlling the magnitude of the voltage, the amount of the backlight light rays diffracted to the displaying regions A is controlled, to realize the variation of the grayscales L0-L255, wherein L0 is the dark state, and L255 is the light state.

As an implementation, the light picking gratings 12 on the light guide plate 13 may be formed by: firstly, etching one of the faces of the light guide plate 13 to form an entire-face grating, then covering the entire-face grating with a mask, and etching the grating strips of the entire-face grating into dots, to form the light picking gratings 12 arranged in a matrix.

Optionally, each of the convex lenses 4 is provided with a light transmitting through hole 5. Preferably, the light transmitting through hole 5 is located at the center of the convex lens 4; in other words, the optical axis of the convex lens 4 passes through the light transmitting through hole 5, and the light transmitting through hole 5 directly faces the light picking grating 12. The backlight light rays that are total-reflection transmitted in the light guide plate 13, after passing through the light picking gratings 12, obtain exiting collimated light beams, and the collimated light beams go to the black matrixes 15 via the light transmitting through holes 5. The aperture of the light transmitting through holes 5 is greater than or equal to the width of the light picking gratings 12, whereby all of the collimated light beams exiting from the light picking gratings 12 can go to the black matrixes 15 via the light transmitting through holes 5. The aperture of the light transmitting through holes 5 is less than or equal to the width of the black matrixes 15, whereby the black matrixes 15 can block (absorb) the collimated light beams exiting from the light picking gratings 12. The aperture used herein refers to the maximum dimension of the light transmitting through hole 5, wherein if the light transmitting through hole 5 is a round hole, the aperture is the diameter of the light transmitting through hole 5; if the light transmitting through hole 5 is a rectangular hole, the aperture is the size of the longer side of the rectangle; and if the light transmitting through hole 5 is a regular-hexagonal hole, the aperture is the size of the longest diagonal line of the regular hexagon. By using the convex lenses having the light transmitting through holes 5, the backlight light rays directly facing the displaying regions A can be focused to the black matrixes 15, without affecting the collimated light beams picked by the light picking gratings 12.

Figure 4:
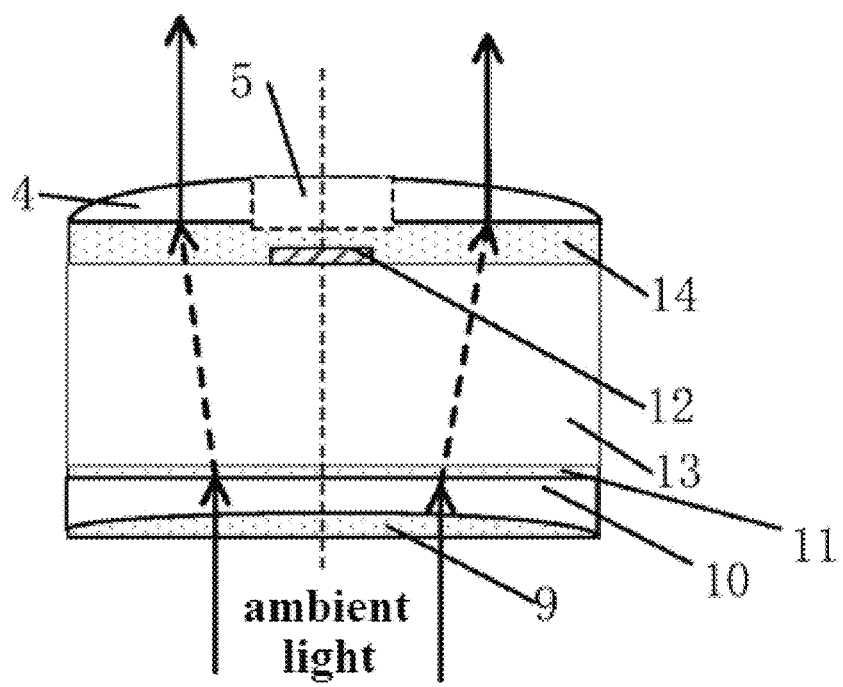
FIG. 4 is a principle diagram of the compensation by the concave lens to the convex lens according to an embodiment of the present application.

Optionally, referring to FIG. 4, in order to prevent that, because of the provision of the light focusing layer, the ambient lights that transmit the transparent displaying base plate are converged, to affect the effect of perspectivity, the light guide plate 13 is provided with a light scattering layer on one side that is further away from the light focusing layer, the light scattering layer comprises concave lenses 10 arranged in an array, the convex lenses 4 directly face the concave lenses 10 one to one, and the focal length of the convex lenses 4 and the focal length of the concave lenses 10 are equal. The concave lenses 10 serve as the compensating components of the ambient lights. The ambient lights, after being scattered by the concave lenses 10, are converged by the convex lenses 4. Because the focal length of the convex lenses 4 and the focal length of the concave lenses 10 are equal, the scattering of the ambient lights by the concave lenses 10 and the convergence of the ambient lights by the convex lenses 4 can be offset, and, after the ambient lights have sequentially passed through the concave lenses 10 and the convex lenses 4, their directions maintain unchanged.

Particularly, as an implementation, the transparent displaying base plate comprises a first light transmitting layer 9. The top face of the first light transmitting layer 9 is of an outwardly convex structure. Using the outwardly convex structure is in order to form the concave lenses 10 arranged in a matrix on the first light transmitting layer 9, and form a second light transmitting layer 11 on the concave lenses 10. The light guide plate 13 is provided on the second light transmitting layer 11. The light picking gratings 12 are provided on one side of the light guide plate 13 that is further away from the second light transmitting layer 11. A third light transmitting layer 14 is provided on one side of the light guide plate 13 that is provided with the light picking gratings 12. The third light transmitting layer 14 serves as the planarization layer of one side of the light guide plate 13 that is provided with the light picking gratings 12. The convex lenses 4 arranged in an array are formed on the third light transmitting layer 14. The liquid-crystal grating layer 3 is formed on the convex lenses 4. The electrodes of the liquid-crystal grating layer 3 employ the modes including but not limited to ADS (Advanced Super Dimension Switch). In other words, it comprises planar electrodes 34, a dielectric layer 33 is provided on the planar electrodes 34, a plurality of strip electrodes 32 arranged side by side are provided on the dielectric layer 33, and a liquid-crystal layer 31 is provided on the strip electrodes 32, to realize a liquid-crystal grating by using the fringing field effect. In the present embodiment, the liquid crystal of the liquid-crystal layer 31 is preferably a liquid crystal of a high index difference, to improve the lighting effect of the liquid crystal. The displaying layer 2 is formed on the liquid-crystal layer 31. An upper base plate 1 is formed on the displaying layer 2. The upper base plate 1 is, for example but not limited to, a glass base plate, and is requested to have a high flatness and a high transparency. The light guide plate 13 is provided with a reflector housing 6 on a side. The reflector housing 6 is used to couple the lambert-reflector light-ray modulation of the backlight sources (for example, the LED light sources 7 and so on) into the light guide plate 13 at a certain central angle. In the total-reflection transmission within the light guide plate 13, the backlight source is provided with a reflecting layer 8 on one side that is further away from the reflector housing 6, and the reflecting layer 8 is used to reflect the light rays propagating away from the reflector housing 6 into the reflector housing 6, to increase the utilization ratio of the light source.

All of the first light transmitting layer 9, the second light transmitting layer 11 and the third light transmitting layer 14 may be a resin layer of a low refractive index, and their refractive indexes are generally not greater than 1.3, to reduce the adverse effect caused by refraction at the corresponding interfaces in the propagation of the light rays.

As another implementation, the light focusing layer comprises Fresnel Zone plates arranged in an array, optical axes of the Fresnel Zone plates pass through the black matrixes, and each of light picking gratings of the grating layer corresponds to one of the Fresnel Zone plates. In other words, in the present implementation, the Fresnel Zone plates replace the above-described convex lenses, and the remaining structures may be the same as those of the above embodiments.

Figure 5:
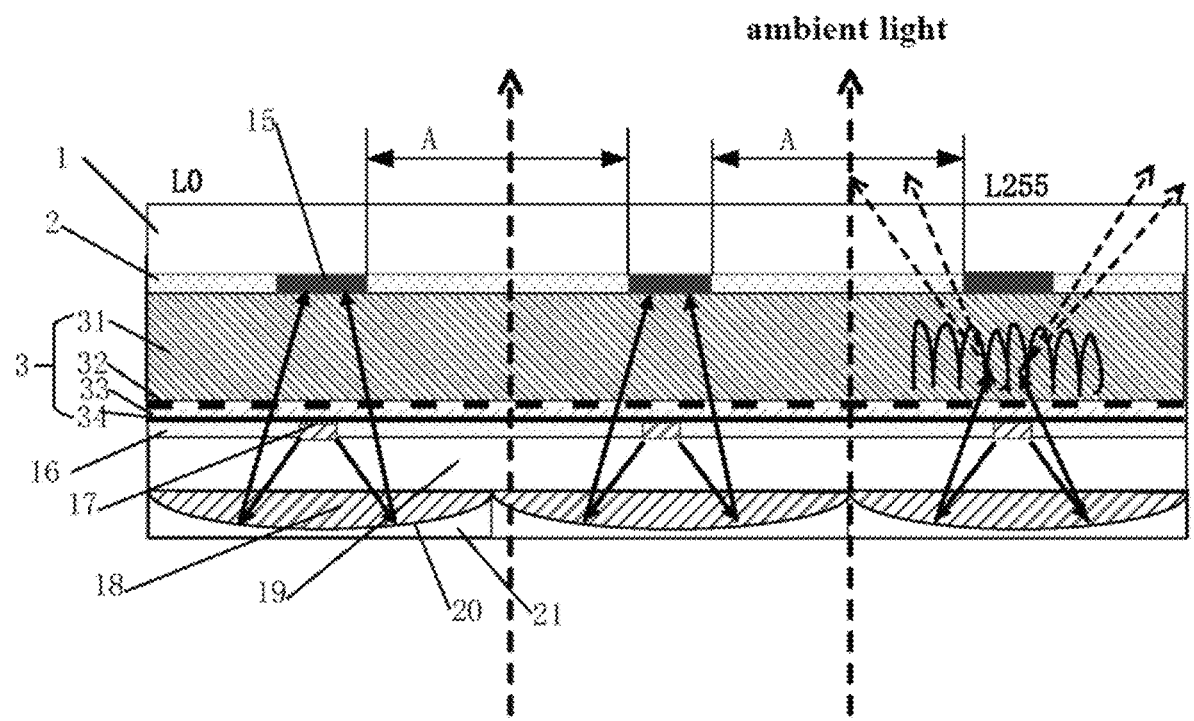
FIG. 5 is a schematic structural diagram of the transparent displaying base plate according to another embodiment of the present application.

As yet another implementation, as shown in FIG. 5, the backlight layer comprises LED light sources 17 arranged in a matrix. Generally, LED light sources 17 are required to have a small size to the greatest extent to reduce their adverse effect of light shielding, the spectrum width should be low, and the LED light sources 17 may also be micro-LEDs or micro-OLEDs. The LED light sources 17 directly face the black matrixes 15. Half-reflection half-transmission films 20 of a concave-face structure are provided at the positions directly facing the LED light sources 17. The inwardly concave faces of the half-reflection half-transmission films 20 are reflecting faces, and face the LED light sources 17 and the black matrixes 15. The lights emitted by the LED light sources 17 are focused by the reflecting faces to the black matrixes 15.

Figure 6:
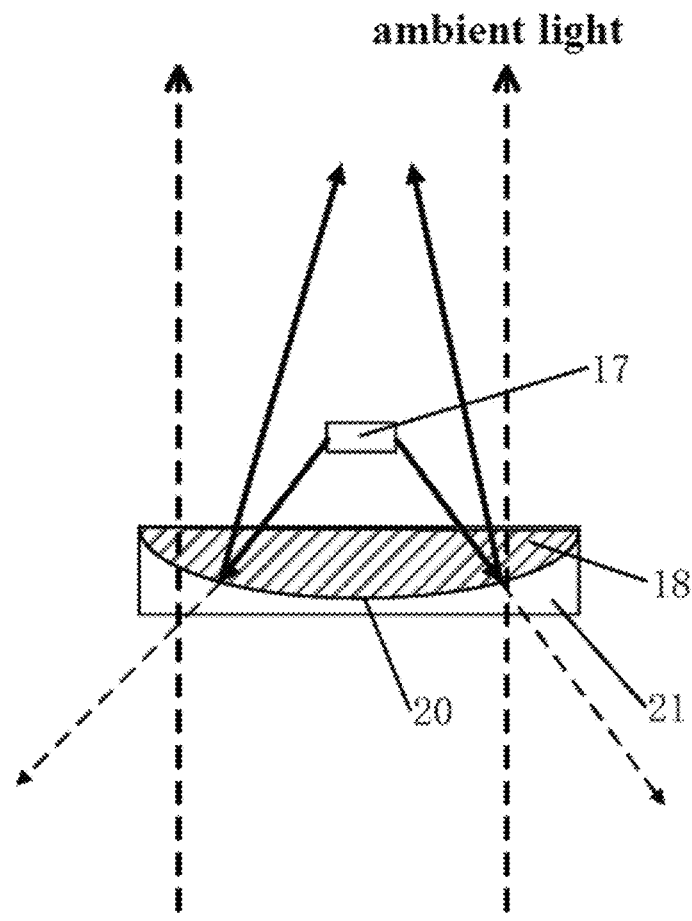
FIG. 6 is a principle diagram of the compensation by the concave lens to the convex lens according to another embodiment of the present application.

Optionally, referring to FIG. 6, a convex lens 18 is formed at the inwardly concave face of the half-reflection half-transmission film 20, and a concave lens 21 is formed at the outwardly convex face of the half-reflection half-transmission film 20, wherein the focal lengths of the convex lens 18 and of the concave lens 21 are equal. In an aspect, the convex lens 18 and the concave lens 21 serve as a receiving structure forming the half-reflection half-transmission film 20; for example, the half-reflection half-transmission film 20 may be plated on the concave face of the concave lens 21 or the convex face of the convex lens 18. In another aspect, the convex lens 18 and the concave lens 21 having the equal focal length are individually placed on the two sides of the half-reflection half-transmission film 20, to form a flat-panel structure. In other words, the concave lens 21 compensates for the effect of light-ray modulation to the ambient lights by the convex lens 18, when the ambient light, when passing through it, is not affected at all. That satisfies the demand on the backlight of transparent displaying.

Particularly, as an implementation, the transparent displaying base plate comprises a first light transmitting layer, the first light transmitting layer comprises concave lenses 21 arranged in an array, and the concave faces of the concave lenses 21 are coated with the half-reflection half-transmission films 20. The convex lenses 18 are formed on the concave faces of the half-reflection half-transmission films 20. A lower base plate 19 is provided on the convex lenses 18. The lower base plate 19 is, for example but not limited to, a glass base plate. The LED light sources 17 arranged in an array are formed on the lower base plate 19, to form a dot-matrix backlight structure. A planarization layer 16 covering the LED light sources 17 is formed on the lower base plate 19. The planarization layer 16 may be a resin layer of a low refractive index, and its refractive index is generally not greater than 1.3, to reduce the adverse effect caused by refraction at the corresponding interfaces in the propagation of the light rays. The liquid-crystal grating layer 3 is formed on the planarization layer 16. The electrodes of the liquid-crystal grating layer 3 employ the modes including but not limited to ADS (Advanced Super Dimension Switch). In other words, it comprises planar electrodes 34, a dielectric layer 33 is provided on the planar electrodes 34, a plurality of strip electrodes 32 arranged side by side are provided on the dielectric layer 33, and a liquid-crystal layer 31 is provided on the strip electrodes 32, to realize a liquid-crystal grating by using the fringing field effect. In the present embodiment, the liquid crystal of the liquid-crystal layer 31 is preferably a liquid crystal of a high index difference, to improve the lighting effect of the liquid crystal. The displaying layer 2 is formed on the liquid-crystal layer 31. An upper base plate 1 is formed on the displaying layer 2. The upper base plate 1 is, for example but not limited to, a glass base plate, and is requested to have a high flatness and a high transparency.

In another aspect, an embodiment of the present application provides a transparent displaying device, comprising the transparent displaying base plate according to any one of the above embodiments. The transparent displaying device may, for example, be a VR (Virtual Reality) device, an AR (Augmented Reality) device, a show-window exhibiting device, and so on.

The above description is merely description on the preferable embodiments of the present application and the technical principles that are utilized. A person skilled in the art should understand that the scope that is involved in the present application is not limited to the technical solutions that are obtained from the particular combinations of the above technical features, but should also encompass the technical solutions that are formed by the random combinations between the above technical features and their equivalent features without departing from the inventive concept, for example, the technical solutions that are formed by the mutual substitution between the above features and the technical features having the similar functions to those disclosed by (not limited to) the present application.

The invention claimed is:

1. A transparent displaying base plate, comprising a displaying layer and a liquid-crystal grating layer provided on one side of the displaying layer, the displaying layer comprising black matrixes and displaying regions defined by the black matrixes, wherein the liquid-crystal grating layer is provided with a backlight unit on one side that is further away from the displaying layer, and the backlight unit comprises a backlight layer for emitting backlight light rays to the displaying layer, and at least one light focusing layer for focusing the backlight light rays directly facing positions of the displaying regions onto the black matrixes.

2. The transparent displaying base plate according to claim 1, wherein the backlight layer comprises LED light sources arranged in a matrix, the LED light sources directly face the black matrixes, half-reflection half-transmission films of a concave-face structure are provided at positions directly facing the LED light sources, and inwardly concave faces of the half-reflection half-transmission films are reflecting faces, and face the LED light sources and the black matrixes.

3. The transparent displaying base plate according to claim 2, wherein the inwardly concave faces of the half-reflection half-transmission films are provided with convex lenses, and outwardly convex faces of the half-reflection half-transmission films are provided with concave lenses, wherein a focal length of the convex lenses and a focal length of the concave lenses are equal.

4. The transparent displaying base plate according to claim 1, wherein the backlight layer comprises a light guide plate, and the light guide plate is provided with a grating layer on one side facing the displaying layer.

5. The transparent displaying base plate according to claim 4, wherein the at least one light focusing layer comprises Fresnel Zone plates arranged in an array, optical axes of the Fresnel Zone plates pass through the black matrixes, and each light picking grating of the grating layer corresponds to one of the Fresnel Zone plates.

6. The transparent displaying base plate according to claim 4, wherein the at least one light focusing layer comprises convex lenses arranged in an array, optical axes of the convex lenses pass through the black matrixes, and each light picking grating of the grating layer corresponds to one of the convex lenses.

7. The transparent displaying base plate according to claim 6, wherein the convex lenses are provided with light transmitting through holes, the light transmitting through holes directly face the light picking gratings, an aperture of the light transmitting through holes is greater than or equal to a width of the light picking gratings, and the aperture of the light transmitting through holes is less than or equal to a width of the black matrixes.

8. The transparent displaying base plate according to claim 6, wherein the light guide plate is provided with a light scattering layer on one side that is further away from the light focusing layer, the light scattering layer comprises concave lenses arranged in an array, the convex lenses directly face the concave lenses one to one, and a focal length of the convex lenses and a focal length of the concave lenses are equal.

9. A transparent displaying device, wherein the transparent displaying device comprises the transparent displaying base plate according to claim 1.

* * * * *